A rotating mold is fed with a flowable mixture of an inorganic filler material powder and a polyester resin for the purpose of generating or building up individual layers. By selecting the rotating speed during the layer buildup a more or less pronounced separation between resin and filler material is produced inside the layer, the value of the separation being selected in accordance with the specific application the component produced is intended to be used for. Subsequently the layer is fed cut glass fibers made to penetrate at least into the innermost resin-enriched region of the generated layer. Owing to this rotational-speed-controlled distribution of filler material and resin inside the layers, larger values of mechanical strength may be obtained with reduced glass requirements. Any "strain-corrosion" may be avoided by using filler materials containing carbonate. The pipe conduit of the invention has thin-walled layers going over into each other and arranged to have layers containing glass fibers alternate with layers containing no glass fibers, the specific structure of the wall cross-section being determined in accordance with the specific requirements of the application at hand.

United States Patent [19]

Carlström

[11] Patent Number: 5,202,076
[45] Date of Patent: Apr. 13, 1993

[54] METHOD FOR PRODUCING MULTI-LAYER PIPE CONDUIT COMPONENTS OF PLASTIC MATERIAL, INORGANIC FILLER MATERIAL AND GLASS FIBERS

[75] Inventor: Börge Carlström, Oberwil, Switzerland

[73] Assignee: Hobas Engineering & Durotec AG, Basel, Switzerland

[21] Appl. No.: 411,562

[22] Filed: Sep. 22, 1989

[30] Foreign Application Priority Data

Sep. 23, 1988 [CH] Switzerland .......... 3542/88

[51] Int. Cl.⁵ .......... B29C 41/04
[52] U.S. Cl. .......... 264/255; 264/311
[58] Field of Search .......... 264/310, 311, 257, 258, 264/250, 255, 308, 312

[56] References Cited

U.S. PATENT DOCUMENTS

| | | | |
|---|---|---|---|
| 3,406,724 | 10/1968 | Carlstrom et al. | 138/137 |
| 4,383,965 | 5/1983 | Rother | 264/311 |
| 4,405,398 | 9/1983 | Rother | 264/311 |
| 4,515,547 | 5/1985 | Rother | 264/311 |
| 4,518,556 | 5/1985 | Yamamoto | 264/311 |
| 4,957,683 | 9/1990 | Hartmann | 264/311 |

FOREIGN PATENT DOCUMENTS 151930 7/1990 European Pat. Off. .

Primary Examiner—Jay H. Woo
Assistant Examiner—James P. Mackey
Attorney, Agent, or Firm—McGlew and Tuttle

[57] ABSTRACT

19 Claims, 5 Drawing Sheets

METHOD FOR PRODUCING MULTI-LAYER PIPE CONDUIT COMPONENTS OF PLASTIC MATERIAL, INORGANIC FILLER MATERIAL AND GLASS FIBERS

BACKGROUND OF THE INVENTION

1. Field of the Invention

The invention refers to a method for producing multi-layer pipe conduit components, such as pipes and couplings, of plastic material, inorganic filler material and glass fibers. The invention equally refers to a pipe conduit component produced by the stated method.

2. Description of the Prior Art

Known methods of, this type are adapted—by feeding a rotating mold with polyester resin, glass fibers and sand—to generate mutually interconnected layers, the entire configuration being subsequently cured. Depending on the intended purpose, i.e. whether the product is a pressure conduit or a nonpressure conduit, the generated layers may be different from each other, there may be layers having glass fibers and/or filler material, or layers containing only filler material. However, the method of separately feeding the individual ingredients of the pipe wall has proven disadvantageous in practice. Particularly when making pipe conduits of relatively small diameters and correspondingly small wall thicknesses, the glass fiber reinforced layers cannot be produced dense enough to guarantee leakproofness of the pipe. In addition, the glass requirements also tend to be rather high.

SUMMARY OF THE INVENTION

Hence from what has been explained heretofore it should be apparent that the art is still in need of a method for producing multi-layer pipe conduit components of plastic material, inorganic filler material, and glass fibers, which method is not associated with the aforementioned drawbacks and limitations of the state-of-the-art proposals.

It is therefore a primary object of the invention to provide a novel method for producing multi-layer pipe conduit components of plastic material, inorganic filler material and glass fibers, which fails to be associated with the disadvantages of the prior art as heretofore discussed and which effectively and reliably fulfills the existing need in the art.

Another and more specific object of the invention relates to a new method of the aforementioned kind, by which it is possible, to achieve in each layer the optimum content of filling material and/or glass fibers as required by the particular application at hand, independent of the pipe conduit diameter, and thus independent of the thickness and the position of the individual layer. Also it is possible, to securely connect the layers by making them integrate with each other, and to insure that the glass fiber reinforced wall layers are dense enough to satisfy the requirements relating to mechanical strength and to the leakproofness of the pipe conduit component produced.

A further object of the invention relates to a new method of the aforementioned kind, which is practical in its details, versatile in its applications, and moderate in its glass requirements, as well as economical as a whole.

Another important object of the invention relates to providing a novel pipe conduit component, such as a pipe or a pipe coupling, to be produced by the method of the invention and to be provided with the features inherent therein.

The foregoing and other objects are attained in accordance with one aspect of the invention. Through the provision of a method for producing multilayer pipe conduit components of plastic material, inorganic filler material and glass fibers, securely interconnected individual layers are generated in a sequence of steps in which a flowable mixture consisting of filler material and resin in a mixing ratio higher than 1:2 by weight is fed to a rotating mold. A predetermined separation of the resin from the filler material is produced inside the generated layer by regulating the rotational speed of the mold during a predetermined length of time. Glass fibers are then fed to the mold arranged to again rotate at a predetermined rotational speed, to make them penetrate at least into the radially inner region of the layer turned resin-enriched layer generated in the separating step. The entire process is then repeated at least once.

The pipe conduit component of the invention, as produced by the method of the invention, is so built of thin-walled layers going over into each other, that layers with glass fibers alternate with layers without glass fibers, the layers without glass fibers being arranged to contain at least 50% by weight, and the layers with glass fibers at least 30% by weight filler material.

Depending on the requirements, several consecutive layers, from the outside to the inside, may so be produced, whereby the quantity and the mixing ratio of the mixture fed at a particular moment, the kind of filler material, the rotational speed of the mold and the quantity and size of the supplied glass fibers, as well as the time of generation of each individual layer, may be fitted to the type and size of the pipe conduit component to be produced. Experiments have in fact irreproachably shown, that the components produced by the method of the invention have considerably improved mechanical strength and density, or compactness, as compared to the known pipes, enabling the use of smaller wall thicknesses and reducing glass and glass fiber reinforcement costs.

BRIEF DESCRIPTION OF THE DRAWINGS

In the following are described in more detail some examples of the method of the invention by making reference to the drawing. In the schematic drawing there show.

DETAILED DESCRIPTION OF THE PREFERRED EMBODIMENTS

The term "separation" as used here is intended to be understood as follows:

A mixture consisting of resin and filler materials and having a content of filler materials of x percent by weight is fed to a rotating mold. After a certain length of time the average value of filler material is determined. If this value equals y percent by weight in the inner region, then the separation SEP in percent is expressed as $$SEP = (1 - y/x) \cdot 100$$

If the product tested for its separation value shows to have less than 50% filler material in it, this may require separate consideration.

Example 1 for producing a pressure pipe:

A mixture consisting of two parts by weight filler material and one part by weight polyester was fed to a rotating mold having an inner diameter of 225 mm. The rotational speed was 543 rpm, corresponding to a g-value of 33. At the end of two minutes a separation of 7.05% was reached, whereby the resin content in the outer layer was 20% by weight, and in the inner layer 38% by weight. Cut rovings were introduced centrifugally at a rotational speed of 380 rpm.

Figure 1:
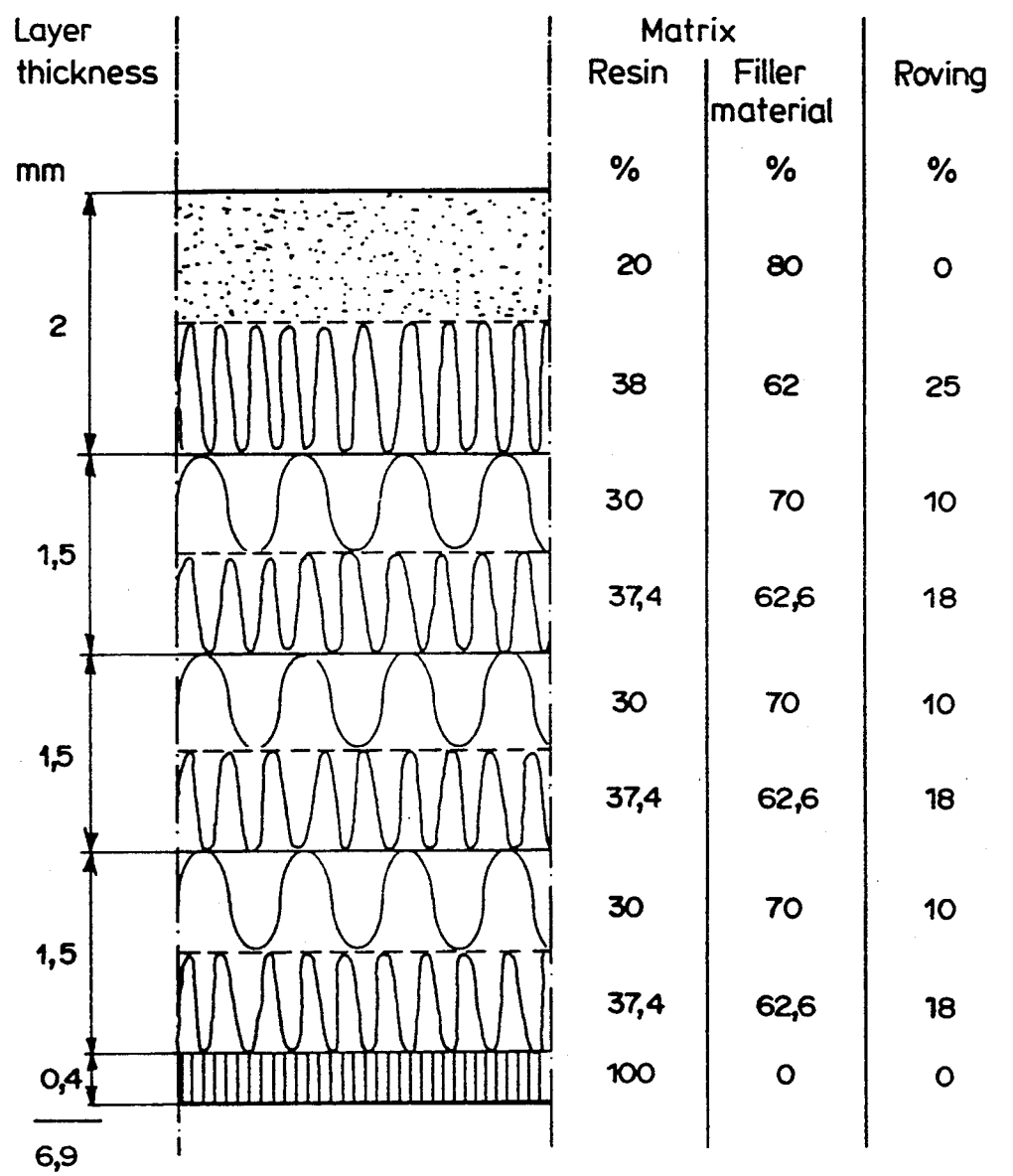
FIG. 1 a cross-section through the wall of a pressure pipe showing a layered construction, FIG. 2 the corresponding cross-section through a nonpressure pipe, FIG. 3 the corresponding cross-section through a coupling, FIG. 4 a cross-section through a pipe coupling and through a part of the associated pipe, FIG. 5 a cross-section through a pipe wall according to example 6, and FIG. 6 a cross-section through a pipe wall according to example 7.

Subsequently, the same mixture consisting of filling material and resin was added at a rotational speed of 380 rpm, corresponding to a g-value of 16.1. At the end of one minute this second layer showed a separation of 6.1%. Cut rovings penetrated the two layers as shown in FIG. 1. This process was repeated twice, subsequent to which a cover layer 0.4 mm thick of a flexible resin was applied. After completed curing, a pipe was obtained having the wall structure shown in FIG. 1. The outer layer showed almost no glass fibers, because the filler material content was so high there, that the fibers were not able to penetrate in the way they did in the other layers. The inner layer consisting of flexible resin was characterized in that in its cured state its elongation at rupture had a value larger than 10%.

Figure 2:
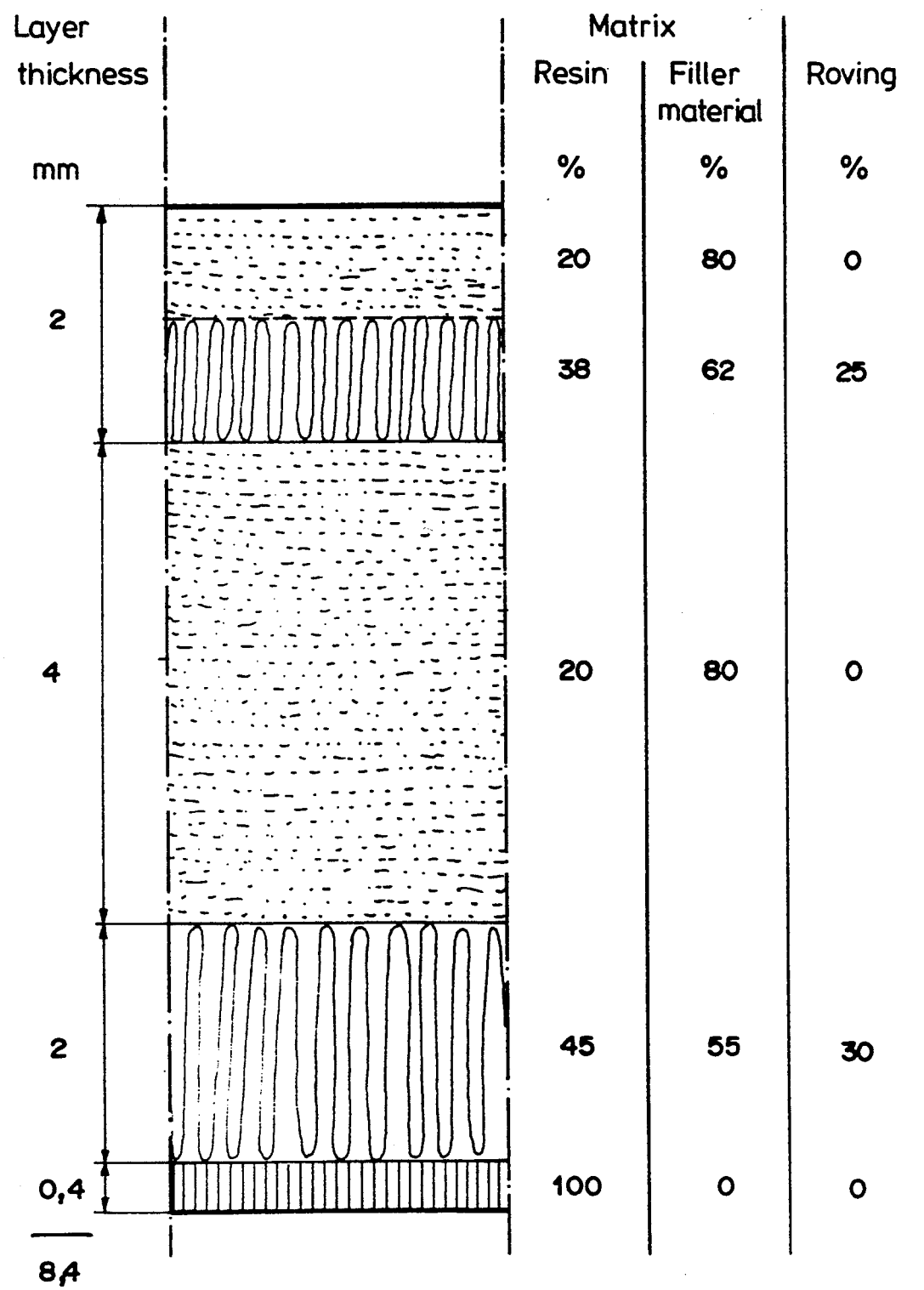

Example 2 for producing a pipe for open-air conduits and thus for nonpressure use:

A mixture consisting of two parts by weight filler material and one part by weight resin was fed to a rotating mold having an inner diameter of 315 mm at a rotational speed of 438 rpm, corresponding to g=34. At the end of two minutes the separation showed a value of 7.0%. Cut rovings were then fed at a rotational speed of 254 rpm to the inner resin-enriched layer. A further mixture consisting of filler material and resin and containing 71% by weight filler material was then fed at a rotational speed increased to 438 rpm. At the end of three minutes the separation that had taken place was as follows. In two thirds of the layer thickness the filler material content had a value of 80%, in the other third, 55%. Cut rovings were fed centrifugally and, subsequently, a further thin layer of flexible resin was applied. After curing, the resulting pipe had a wall structure as shown in FIG. 2.

Example 3 for producing a pipe coupling:

A mixture consisting of 60 parts by weight filler material and 100 parts by weight polyester resin was fed to a rotating mold having an inner diameter of 347 mm, until a layer thickness of 4 mm was obtained. The rotational speed had a value of 203 rpm, corresponding to a g-value of 8. At the end of three minutes the separation obtained was 67%, with the content of filler material being 50% by weight in the outer part, and 16.7% by weight in the inner part. 50 mm long rovings were centrifugally fed to both layers. The process was then once repeated.

Figure 3:
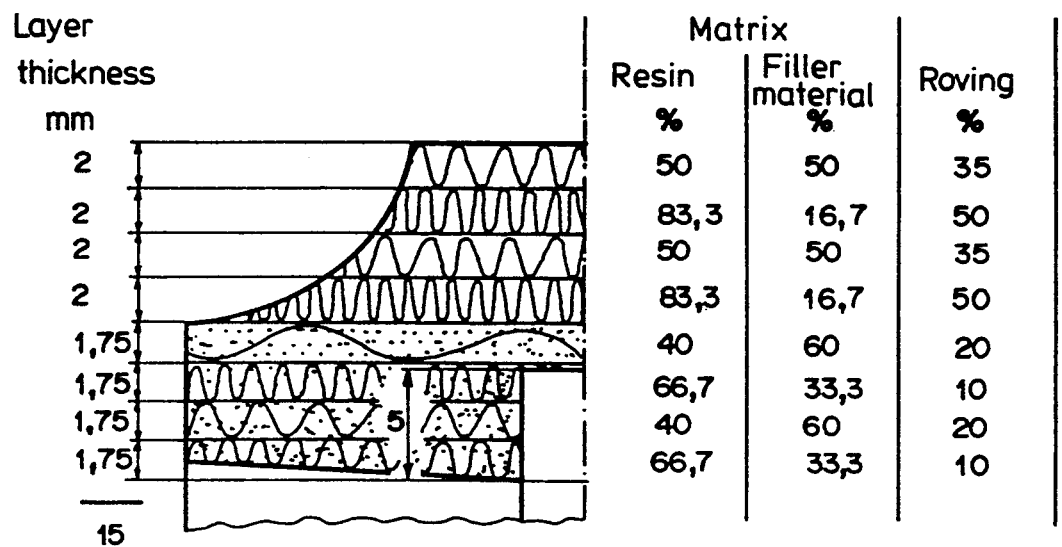

A mixture consisting of 100 parts by weight filler material and 100 parts by weight polyester resin was then fed at the same rotational speed. At the end of 30 seconds the separation obtained was 50%, with the content of filler material being 33% in the inner part and 60% in the outer part of this third layer. Short glass fibers 20 mm long were then centrifugally fed to both layers. The process was then once repeated. At the end of the curing step the required slots could be ground in place. A coupling ring having a wall as shown in FIG. 3 was thus obtained. A ring of this kind may be used with pipes having outer diameters of 340 mm.

It is clear from the above examples that the weight ratio of the components of the mixture consisting of filling material and resin was always larger than 1:2. However, the exact weight ratio in the individual layers of the completed pipe conduit component was actually determined by the separating process taking place in each case.

If using very fine filler materials and a weight ratio of 2:1 between filler material and resin, the viscosity may be as high as 5000 cps or higher. At such viscosities the separation is very low and lies, at normal rotational speeds and treatment duration, in the order of magnitude of 2 to 5%. At the same time, high contents of filling material, as well as high values of viscosity are obtained in both layer regions. However, if high mechanical strength of the pipe conduit component, a pipe or a coupling, is to be achieved, a great number of thin layers must be generated. It turned out, that with pipes having diameters between 200 and 400 mm and a wall thickness of 10 mm, the layer thickness at which optimum economy may be obtained lies between 0.1 and 0.7 mm. This will be explained in the following examples:

Example 4:

A mixture having 200 parts by weight filler material and 100 parts by weight polyester resin was fed to a rotating mold with an inside diameter of 225 mm. The mixture had a viscosity of 6000 cps. The rotational speed was 350 rpm. At the end of 30 seconds a separation of 2% was obtained. Cut rovings were then introduced. The thickness of the individual layer had a total value of 0.65 mm. The process was repeated 9 times, at the end of which a pipe having a wall thickness of 6.5 mm was obtained. The glass fiber content was 15% by weight, the bursting pressure 50 bar.

Figure 4:
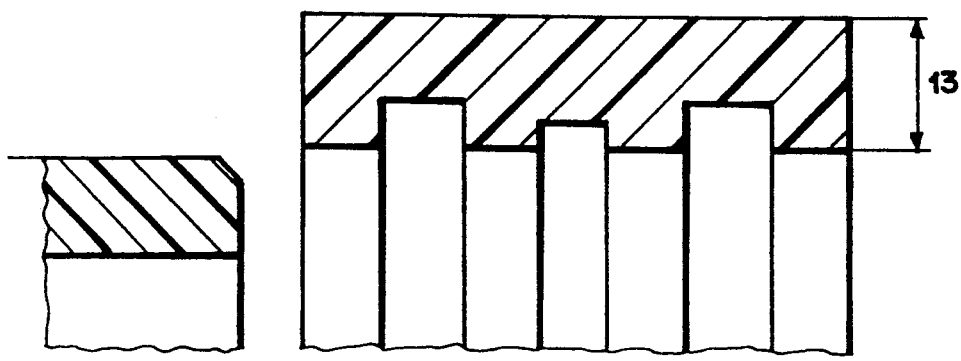

Example 5:

The single step for generating a 0.65 mm thick layer, as above described in Example 4 was repeated 20 times in a rotating mold having an inside diameter of 253 mm, so that a ring was obtained, into which could be ground ring-shaped slots, to produce a pipe-coupling having its wall cross-section as shown in FIG. 4. Such a coupling is adapted to be used at a working pressure of 10 bar in conjunction with pipes having outer diameters of 225 mm.

Figure 5:
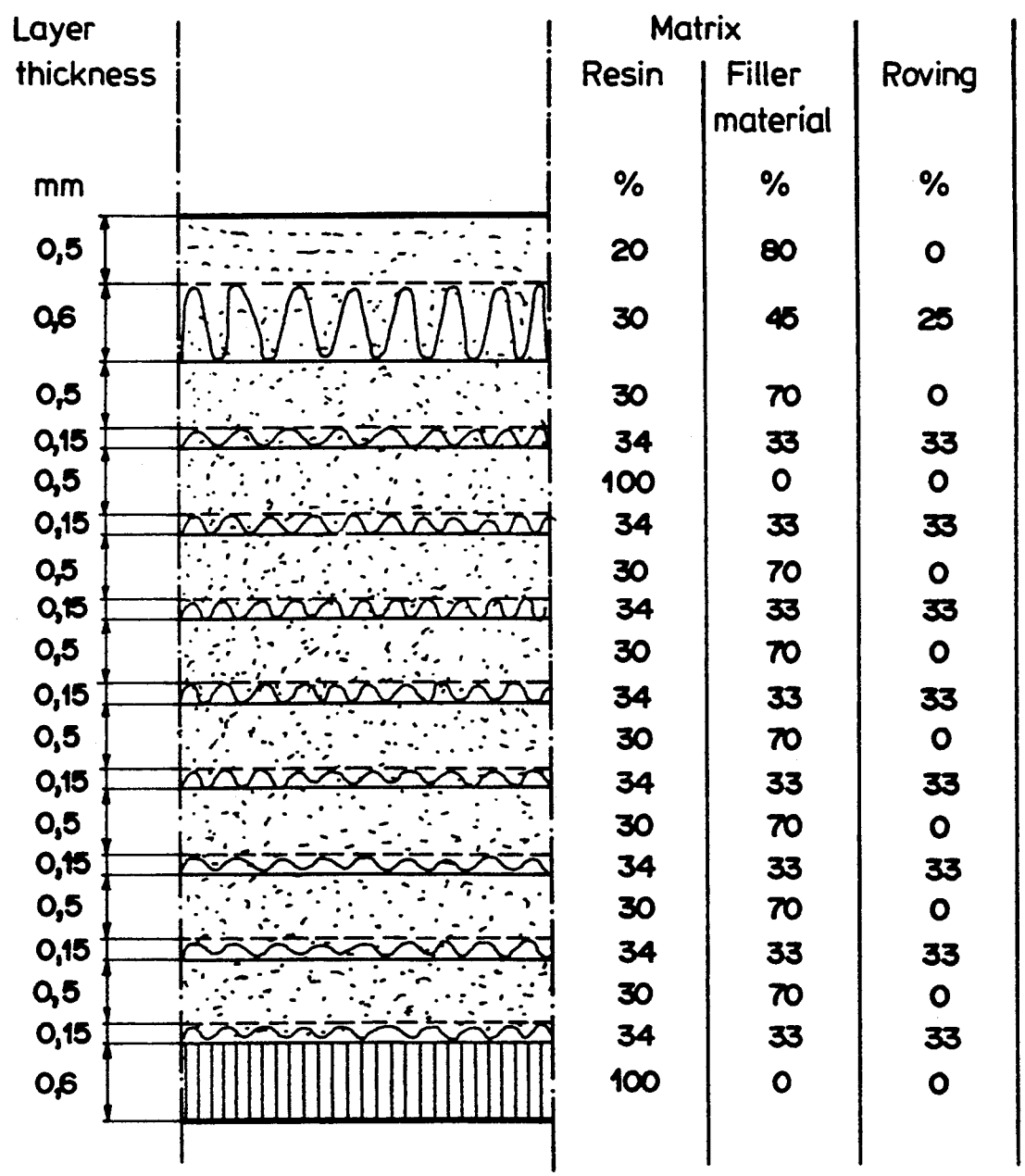

Example 6:

A mixture consisting of 200 parts by weight filler material and 100 parts by weight polyester resin, and having a viscosity of 6000 cps, was fed to a mold rotating at 350 rpm and having an inner diameter of 225 mm. Glass fibers in the form of cut rovings were introduced immediately thereafter, whereby the material used was not more than that required for a maximum thickness of 0.65 mm of the individual layer. This process was then repeated 8 times. By additionally feeding pure resin at the end of a waiting period of one minute, a pipe wall as shown in FIG. 5 is obtained, whereby, to be sure, the layers supplied with pure filler material also contained some glass fibers.

Figure 6:
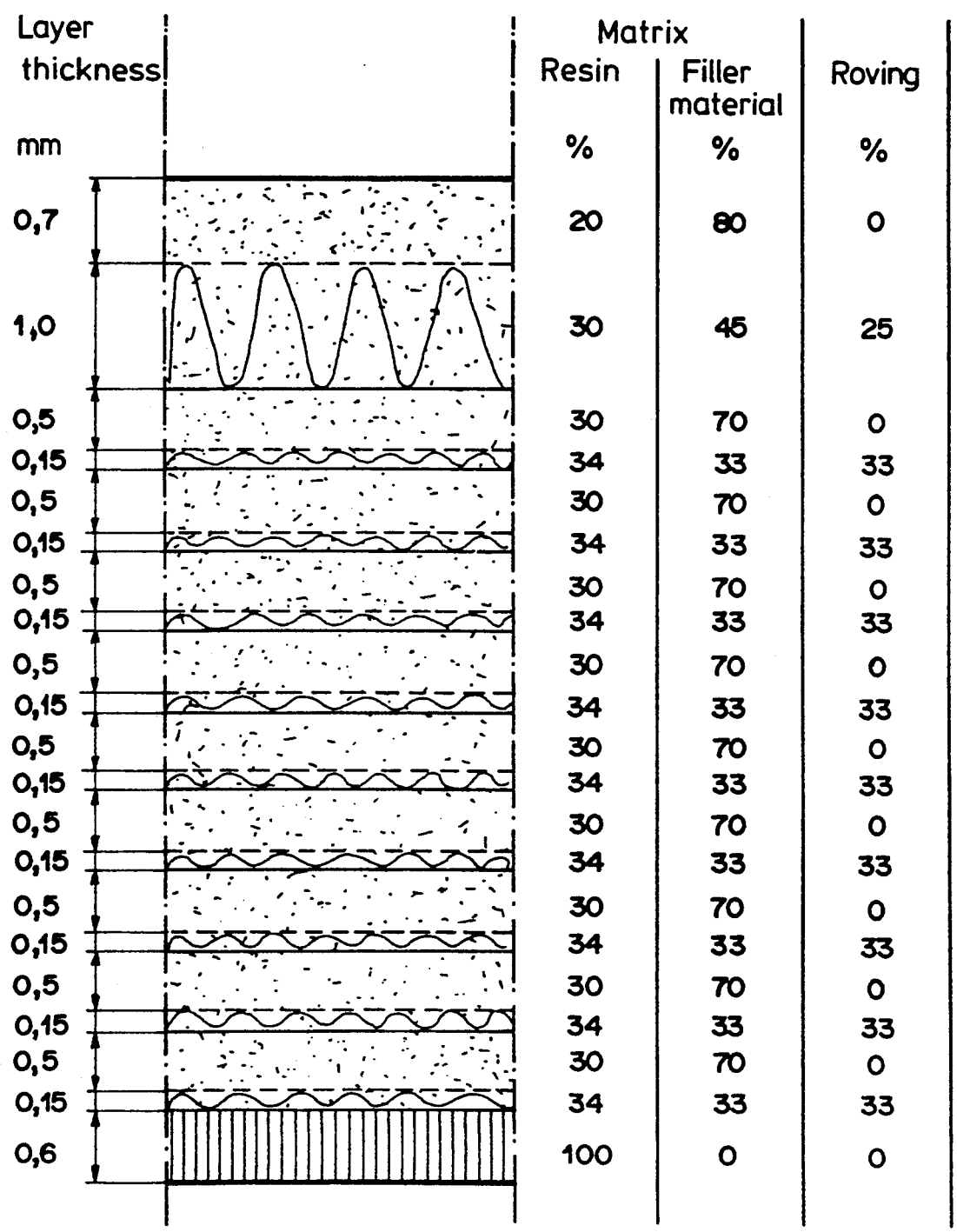

Example 7:

The process according to Example 4 was repeated 8 times, whereby, as in Example 6, the glass fibers were introduced immediately after feeding the mixture of filler material and resin. Two partial layers or regions, were generated nine times one of which contained mainly mixture of filler material and resin and a few glass fibers, but the other contained glass fibers impregnated with mixture of filler material and resin as described before and shown in FIG. 6.

Subsequently, a mixture of filler material and resin was fed, then, after a waiting period of one minute glass fibers were added, and at the end pure resin was again fed.

Filler materials suited for the present purpose are aluminum hydroxide, very fine quartz powder, powder of various types of clay, dolomite powder and chalk, i.e. calcium carbonate. These powdered inorganic filler materials characterized by grain sizes of less than 0.1 mm may be used in pure form or in the form of mixtures.

Other materials such as quartz sand, feldspar and others, having grain sizes between 0.1 and 1.0 mm may be used as supplementary materials to be added in the aforedescribed manner in the process. This is normally done in the middle layers, particularly when making thick-walled pipes, as for example checking pipes.

Example 8:

A mixture consisting of 150 parts by weight filler material and 100 parts by weight resin is fed by means of a lance to a rotating mold having an inner diameter of 1228 mm and a length of 6 meters. The lance was fed at a feeding rate of 6 m/min and was withdrawn at the same rate after having completed the feeding of the mixture. Subsequently the mold was fed glass with fibers in the form of rovings cut to 50 mm length at the same constant feeding rate and with the same lance. Two layers were generated: An outer layer consisting of about 75% filler material and 25% resin and a reinforcing layer comprising 35% glass fibers and a matrix of filler material and resin.

The pipe was then built-up further by applying several coats of sand, glass fibers and the 150:100 ratio mixture of filler material and resin. The generated layers contained about 3% glass fibers, 18% resin, 27% filler material and 52% sand.

An additional coat of the mixture of filler material and resin was then formed and the lance was withdrawn. Subsequently, glass fibers only were fed and at the end pure resin.

A pipe having a wall thickness of 25 mm was thus obtained. The pipe had a stiffness of $11200 N/m^2$ and a deformation of 19% at rupture.

It turned out, that carbonate powder was particularly suited as filler material or as component of the filler material. Even though carbonate is not acid-resistant, the filler materials containing carbonate yielded very good results. They are suited for increasing the corrosion resistance of glass fiber reinforced products, particularly of such products as are subject to large bending stresses, as is the case in pipes imbedded into the ground.

If a glass fiber reinforced pipe is subjected to circumferential stresses and is used to carry sulphuric acid, cracks may show up inside the pipe. Sulphuric acid will then leak through the cracks and will reach the glass fibers. These glass fibers will be attacked by the sulphuric acid and CaO-groups will be removed from the surface of the glass. The result will be a significant reduction in the bending strength of the pipe with consequent failure. This mechanism is referred to as "strain corrosion" by specialists in the field. The resistance against "strain corrosion" may be increased by replacing the conventional E-glass by the so-called ECR-glass. Glass fibers made of ECR-glass are more expensive than those of E-glass and are more difficult to get. No "strain corrosion" will take place if filler materials containing carbonate are used.

Increased mechanical strength may be obtained by working with fibers having various lengths. Suitable for this purpose is a mixture of short, medium and long fibers, for example in the ranges 10 to 16 mm, 20 to 30 mm, and 35 to 60 mm.

The invention is not limited to the production of pipe conduit components of small diameters. As a matter of fact, it may also be used for making large diameter pipes. If large diameter pipes of 600 mm and more are produced, the method of the invention may be applied in particular for making the inner pipe region, i.e. the barrier layer.

Sufficient bursting strength has been realized in the art by using expensive polyester resins, such as vinyl esters. This has bearing on the fact, that high exothermic temperatures which arise in thick-walled pipe components, such as couplings, are effective to generate high internal stresses. These internal stresses lead to delaminations and perviousness, unless resins of high mechanical strength and adhesiveness to glass fibers are used. The present invention makes it possible to produce couplings that are by 60% less expensive and have higher resistance against internal pressure.

The invention is most successful if used with the centrifugal process, but is not limited to the same. It may also be used in conjunction with the winding process, particularly for increasing the resistance against "strain corrosion". In this case the procedure preferably pursued is as follows: A mat made of glass fibers and soaked in a mixture consisting of a filler material and resin is wound onto a rotating core having an outer diameter of 500 mm. The mixture could contain 70 parts by weight filler material and 100 parts by weight polyester resin. Having obtained a layer thickness of 2.5 mm a step of winding rovings soaked in polyester resin is performed, until an overall wall thickness of 5 mm has been reached. By using chalk as filler material in the mixture containing normal resin, it is possible to obtain a pipe particularly resistant against "strain corrosion".

In the examples described the expression "normal polyester resin" is meant to refer to resins based on the orthophtalic and isophtalic acids. However, the invention is not limited to these two types of polyester resins. Depending on the pursued purpose, other resins, such as terephtalic resins, bisphenol resins and vinyl resins may be used. Resins having high elongation at rupture are preferably used, particularly for pressure pipes. The elongation at rupture should then be as high as 3 to 4%, a value which may be further increased by adding flexible resins.

Carbonate containing filler materials are particularly suited for making pipes and couplings for ground-imbedded pipe conduits.

While there are shown and described present preferred embodiments of the invention, it is to be distinctly understood, that the invention is not limited thereto but may be otherwise variously embodied and practiced within the scope of the appended claims.

What is claimed is:

1. Method for producing multi-layer pipe conduit components of plastic material, inorganic filler material and glass fibers, where securely interconnected individual layers are generated in a sequence of steps comprising:
   (A) feeding a flowable mixture into a rotating mold, said flowable mixture having a ratio of one or more parts by weight of a filler material to two parts by weight of a resin;
   (B) separating said resin from said filler material by regulating a rotational speed of said mold during a predetermined length of time, said filler material and said resin generating a layer due to said rotational speed of said mold, said generated layer having a resin-enriched radial inner region;
   (C) subsequent, glass fibers are fed into said mold and said mold is arranged to rotate at another predetermined rotational speed to make said glass fibers penetrate into said resin enriched radial inner region of said layer generated in said separating step;
   repeating steps (A), (B) and (C); and
   solidifying said resin.

2. Method as claimed in claim 1, wherein: said filler material is a fine-grain filler material and said resin is a polyester resin.

3. Method as claimed in claim 2, for producing a component for pipe conduits subject to high internal pressure, wherein the layers are generated in sequence from the outside toward the inside by feeding the mixture of one or more parts by weight of filler material and one part by weight of resin to the mold at said rotational speed of the mold corresponding to a gravity or g-value larger than 15 gravitational units.

4. Method as claimed in claim 3, wherein the individual layers are generated by feeding into the mold the mixture of two or more parts by weight of filler material and one part by weight of resin, with the result that in a radially outermost layer a larger separation will take place than in other layers, and wherein after accomplished feeding of the mixture of filler material and resin, glass fibers are fed to each layer so that the glass fibers will penetrate the radially outermost layer only in the inner, resin-enriched region thereof, while other glass fibers added to other layers will also penetrate in layer regions of the remaining generated layers that have become poorer in resin.

5. Method as claimed in claim 2 for producing a pipe conduit component for nonpressure conduits, wherein layers disposed sequentially from an outside to an inside are generated by feeding into the mold the mixture having one or parts by weight of filler material and one part by weight of resin, the mixture of filler material and resin in a radially outer layer has a ratio by weight of filler material to resin larger than that in a radially inner layer, said separating of the mixture inside the radial outer layer and radial inner layer being so regulated, that a larger portion of the radially outer layer will become poorer in resin and richer in filler material than in the radially inner layer, said glass fibers fed into said mold and into the two layers as well as said rotational speed being so controlled, that the glass fibers will penetrate only resin-enriched layer regions.

6. Method as claimed in claim 2, wherein layers are generated in sequence from an outside toward an inside using mixtures of one part or more by weight of filler material and one part by weight of resin, and wherein said separating of the layers is so regulated, that radially more outwardly layers will end up with layer regions richer in resin than radially more inwardly layers, said glass fibers fed into said mold and said rotational speed being controlled such that the radially more inwardly layers will receive fewer glass fibers than the radially more outwardly layers, all of the layers continuously contain glass fibers, and subsequent to said solidifying of all of the layers, slots are ground into the radially inwardly layers, said slots accommodate sealing rings.

7. Method as claimed in claim 2, wherein the mixture of filler material and polyester resin has a viscosity to effect a separation lower than 5% during said separating, and wherein the individual layers are of a thickness to cause a glass fiber layer to be created by the penetration of the resin-enriched region of the mixture of filler material and resin into the glass fibers.

8. Method as claimed in claim 7, wherein the individual layers are generated to thicknesses less than 0.7 mm.

9. Method as claimed in claim 8, wherein during said separating a larger separation is made to take place in a radially outermost layer than in successive layers.

10. Method as claimed in claim 8, wherein during said separating a larger separation is made to take place in a radially innermost layer of filler material and resin than in preceding layers.

11. Method as claimed in claim 9 or 10, wherein an innermost glass fiber layer is made to a thickness larger by 30% than the thickness of preceding glass fiber layers.

12. Method as claimed in one of the claims 1 or 3, wherein the filler material is a powder selected from the group consisting of aluminum hydroxide powder, quartz powder, powder made of clay, dolomite powder, calcium carbonate powder, and a mixture of at least two of these powders, wherein the powder particles have diameters smaller than 0.1 mm.

13. Method as claimed in claim 1, wherein the resin used is a polyester resin having a base element selected from the group consisting of orthophtalic acid, isophtalic acid, terephtalic acid resin, bisphenol resin and vinyl resin with or without a flexible resin additive.

14. Method as claimed in claim 1, wherein cut glass fibers of equal or variable lengths in the ranges 10 to 16 mm, 20 to 30 mm and 30 to 60 mm, are used.

15. Method for producing a pipe conduit component as claimed in one of the claims 1 or 3, wherein said filler material comprises a carbonate.

16. Method as claimed in claim 15, wherein a layer of supplementary material having grain diameters from 0.1 to 1 mm is applied adjacent to a layer having glass fiber.

17. Method as claimed in claim 16, wherein said supplementary material is selected from the group consisting of sand, quartz and feldspar.

18. A method for producing pipe components, the method comprising the steps of:
   inserting a mixture consisting of filler material and resin into a rotating mold;
   separating said filler material and said resin in said mold by rotating said mold at a predetermined speed and for a predetermined time;
   inserting fibrous material into said mold; and
   forcing said fibrous material into said filler material and said resin by rotating said mold at another predetermined speed and for another predetermined time.

19. A method in accordance with claim 18, wherein: all of said steps are repeated until the pipe is of a desired strength.

* * * * *